(12) United States Patent
Zeuner et al.

(10) Patent No.: US 7,766,592 B2
(45) Date of Patent: Aug. 3, 2010

(54) SCREW NUT FOR TORQUE LIMITING, AND THE USE OF SUCH A SCREW NUT IN A RETAINER MODULE FOR LIMITING THE CLAMPING FORCE

(75) Inventors: Lutz Zeuner, Hamburg (DE); Lueder Kosiankowski, Harsefeld (DE); Hans-Peter Guthke, Buxtehude (DE)

(73) Assignee: Airbus Deutschland GmbH (DE)

( * ) Notice: Subject to any disclaimer, the term of this patent is extended or adjusted under 35 U.S.C. 154(b) by 715 days.

(21) Appl. No.: 11/584,210

(22) Filed: Oct. 20, 2006

(65) Prior Publication Data

US 2007/0098517 A1  May 3, 2007

(30) Foreign Application Priority Data

Oct. 21, 2005  (DE) .................. 10 2005 050 594

(51) Int. Cl.
*F16B 31/00* (2006.01)
(52) U.S. Cl. .......................... 411/6; 411/431
(58) Field of Classification Search ............ 411/1, 411/5, 6, 431–434; 24/868.1, 74.1, 133, 24/132 WL, 135 R, 135 N, 132 R; 403/41
See application file for complete search history.

(56) References Cited

U.S. PATENT DOCUMENTS

| | | | | |
|---|---|---|---|---|
| RE26,762 E | * | 1/1970 | William | 411/1 |
| 5,020,949 A | * | 6/1991 | Davidson et al. | 411/7 |
| 5,653,481 A | * | 8/1997 | Alderman | 285/363 |
| 6,082,941 A | | 7/2000 | Dupont et al. | |
| 6,086,282 A | * | 7/2000 | Dutt et al. | 403/41 |
| 6,361,260 B1 | * | 3/2002 | Schirrmacher | 411/433 |
| 7,029,216 B2 | * | 4/2006 | McKay | 411/6 |
| 2007/0138353 A1 | | 6/2007 | Guthke et al. | |

FOREIGN PATENT DOCUMENTS

| | | |
|---|---|---|
| DE | 102005039652 | 3/2007 |
| EP | 0 328 376 | 8/1989 |
| JP | 2000-027886 | 1/2000 |
| JP | 2005-226789 | 8/2005 |

* cited by examiner

*Primary Examiner*—Gary Estremsky
(74) *Attorney, Agent, or Firm*—Lerner, David, Littenberg, Krumholz & Mentlik, LLP

(57) ABSTRACT

The present application describes to a screw nut for limiting the torque or the clamping force that is produced by screwing a screw onto a component to be screwed into place, as well as to the use of such a screw nut in a retainer module. The screw nut comprises a clamping body which during screwing comes to rest against the component to be screwed into place. Furthermore, the screw nut comprises a screw body, by means of which the screw nut can be screwed onto the screw. The clamping body and the screw body are movably arranged between an unlocked position and a locked position so that when a defined clamping force is exceeded the unlocked position is taken up, with a restoring force continuously acting against this state transition.

12 Claims, 12 Drawing Sheets

SCREW NUT FOR TORQUE LIMITING, AND THE USE OF SUCH A SCREW NUT IN A RETAINER MODULE FOR LIMITING THE CLAMPING FORCE

BACKGROUND OF THE INVENTION

The present invention relates to a fastener. In particular, the invention relates to a screw nut, by means of which the torque or the clamping force that is produced by screwing a screw onto a component to be fastened is limited. Furthermore, the invention relates to the use of such a screw nut according to the invention in a retainer module for affixing lines so that the clamping forces for affixing that can be applied to the lines can be limited in a defined manner.

As a rule, screw-to-nut connections are used in order to subject components that are located between the screw head and the screw nut to clamping force so that the position of these components is fixed. Often there is a requirement for limiting the clamping force that can be produced by way of the screw and the nut, either so as not to exceed the permissible tensile stress in the shaft of the screw or so as to limit the clamping forces acting on the components, in view of the permissible material stress of the components. Since, as a rule, there is a linear connection between these clamping forces and torques that are applied to the screw-to-nut connection, normally the torque is used as a guide value by means of which conclusions can be drawn in relation to the clamping force produced.

In order to be able to exert a defined clamping force onto a screw-to-nut connection, frequently so-called torque wrenches are used, by means of which a predeterminable torque, and thus a certain clamping force, can be applied to the screw-to-nut connection. Such torque wrenches frequently have a very expensive adjustment mechanism by means of which the torque that can be produced with the torque wrench can be set, wherein exceeding the torque causes the torque wrench either to generate an audible noise or to automatically disengage, i.e. rotate without load. While with the use of such torque wrenches a predeterminable torque can be applied to a screw-to-nut connection, such torque wrenches are however, as a rule, very large, heavy and therefore also relatively unwieldy to use so that they are in many respects associated with disadvantages.

In particular if thousands of screw-to-nut connections are to be tightened with such a torque wrench, as is, for example, the case when assembling aircraft structures, the handling of such large and heavy torque wrenches is unsatisfactory from an ergonomic point of view. Furthermore, in particular in the field of assembling aircraft structures, the screw-to-nut connections are frequently difficult to access so that with the use of such a large torque wrench they are either inaccessible or barely accessible.

SUMMARY OF THE INVENTION

Starting with the problems described above, which can occur when a screw-to-nut connection is tightened with the use of a known torque wrench, there may be a need to provide an implementation by means of which in a simple manner and without the use of a torque wrench a torque or clamping force of a predeterminable extent can be applied to a screw-to-nut connection.

The screw nut according to an exemplary embodiment of the invention may be used to limit the torque or the clamping force that is applied when screwing the nut with a screw onto a component to be fastened. The screw nut according to an exemplary embodiment of the invention comprises a clamping body which during screwing comes to rest against the component to be screwed. Apart from this, the screw nut according to an exemplary embodiment of the invention further comprises a screw body that comprises an internal thread, by means of which the screw nut can be screwed onto the above-mentioned screw. The clamping body and the screw body are movably arranged in axial direction of the internal thread of the screw body between an unlocked position and a locked position so that when a defined clamping force or torque that is applied with the screw nut is exceeded, the unlocked position is taken up, against which state transition, starting from the locked position, a restoring force continuously acts, which restoring force attempts to return the clamping body and the screw body to their initial state in which they are in the locked position.

If thus in the case of a screw connection a screw nut according to an exemplary embodiment of the invention is used, it is not necessary to use a torque wrench to limit the torque, because, as soon as a permissible torque or clamping force is exceeded, the screw nut takes up the unlocked position in which it is no longer possible to increase the clamping force because the clamping body turns without engagement in relation to the screw body.

In the above-mentioned unlocked position, the clamping body and the screw body are not in engagement with each other so that they can be rotated in relation to each other. In contrast to this, in the locked position the clamping body and the screw body engage each other having positive fit and thus, just like a conventional screw nut, provide a means by which a clamping force can be applied to a component to be screwed into place. Thus, as long as the screw nut or the clamping body and the screw body are in their initial position in which they are in the locked position, the screw nut can be screwed onto a screw just like a conventional nut so as to apply a desired clamping force onto a component to be screwed into place. As soon as a defined clamping force has been applied to the component with the use of the screw-to-nut connection, the unlocked position of the clamping body and the screw body will be taken up, in which position these two bodies are no longer in engagement with each other so that any further rotary movement applied by way of the clamping body cannot be converted into additional clamping force, as a result of which, limitation of the clamping force or of the torque can be achieved.

So that, when the unlocked position has been taken up, when the clamping force diminishes, the clamping body and the screw body can be moved back to their initial position in which they are in the locked position so as to increase the clamping force anew by means of the screw nut, the clamping body and the screw body are movably arranged in relation to each other in an elastically sprung manner between the unlocked position and the locked position in order to generate the restoring force. With this elastically sprung arrangement of the two bodies in relation to each other a situation can be achieved in which the clamping body in relation to the screw body is continuously made to move back to the locked position so that if the clamping force diminishes, said clamping force can be applied again by means of the screw nut.

According to a further aspect of the invention, the clamping body and the screw body are arranged coaxially in relation to each other so that the screw body comes to rest quasi in the interior of the clamping body. To this effect the clamping body comprises a through aperture or through hole in which it accommodates the screw body. This through aperture is arranged such that the screw body can be accommodated in it in order to be able to move to and fro, in longitudinal direction of the interior thread of the screw body, between the unlocked position and the locked position.

According to another aspect, the screw nut according to an exemplary embodiment of the invention further comprises a spring element which generates the restoring force between the clamping body and the screw body. The design of this spring element is not limited to any special embodiment, provided it is able to generate the restoring force between the clamping body and the screw body, or, in other words, it is able to continuously cause the clamping body and the screw body, starting from the unlocked position, to move to the locked position. While the spring element is not limited to any special embodiment, exemplary embodiments of the spring element can however comprise a spring element that is designed as a helical spring, rubber spring, leaf spring, saucer spring or air spring.

In order to be able to ensure good force transmission from the spring element to the two bodies, the spring element extends between a first abutment surface on the clamping body and a second abutment surface on the screw body. For example, the first abutment surface can be a ring shoulder located in the through aperture of the clamping body. Accordingly, the second abutment surface can be a ring flange that circumferentially encloses the screw body in a collar-like manner. In this design of the abutment surfaces the spring element extends in radial direction in relation to the internal thread of the screw body coaxially between the screw body and the clamping body, and in axial direction of the internal thread of the screw body said spring element is fitted between the two abutment surfaces mentioned. In this way a very compact design of the screw nut according to the invention can be achieved so that the screw nut can be used even in very confined spaces.

As has already been described at the beginning of the presentation of the invention, the clamping body and the screw body in the locked position engage each other, having positive fit, by way of a positive-locking mechanism. This positive-locking mechanism can, for example, comprise an internal cone that extends coaxially in the through aperture of the clamping body and comprises first positive-locking means. Apart from this the positive-locking mechanism can comprise an external cone that circumferentially encloses the screw body and comprises second positive-locking means that correspondingly match the first positive-locking means. In this arrangement the internal cone and the external cone match each other in such a way that they can plunge into each other in the locked position so that the first positive-locking means and the second positive-locking means can engage each other having positive fit. In contrast to this, in the unlocked position the internal cone and the external cone face each other separated by a space so that the first and the second positive-locking means no longer engage each other so that the screw body and the clamping body can be rotated without hindrance relative to each other on the axis of the internal thread of the screw body.

While the clamping body can have any desired external contour that is suitable to apply a torque to the clamping body so as to be converted to a clamping force by way of the clamping body, it can, however, be advantageous if the clamping body is of a cylindrical design whose main axis extends so as to be perpendicular to the axial direction of the internal thread of the screw body. In this way the clamping body can be accommodated by a component to be tensioned and in this process said clamping body can then serve as a type of rocking- or swiveling axis on which the component can be tilted. The precise reason for a cylindrical design of the clamping body will become clear in the following description of the use of the screw nut.

As has already been mentioned above, the invention further proposes the use of a screw nut according to an exemplary embodiment of the invention in a retainer module that is suitable for affixing lines of different thicknesses. The retainer module comprises a basic body with at least one bearing surface for accommodating a line, as well as an abutment surface by means of which the basic body can be attached to a structural component of an aircraft. Furthermore, the retainer module comprises at least one traverse, designed as a balance arm, with at least one counter-bearing surface that is movably positioned in relation to the basic body such that the line as a result of movement of the traverse, of which there is at least one, can be affixed in at least one degree of freedom between the bearing surface of the basic body, of which bearing surface there is at least one, and the counter-bearing surface, of which there is at least one, of the traverse, of which there is at least one. Furthermore, the retainer module comprises at least one screw that movably connects the traverse, of which there is at least one, to the basic body, and which screw is suitable to cause the traverse, of which there is at least one, to move in the direction of the basic body. The screw nut according to an exemplary embodiment of the invention is then in this retainer module fitted into a cylindrical opening in the middle of the balance arm, to which effect the screw nut comprises a correspondingly designed cylindrical external contour so that the balance arm can be rocked in relation to the bearing surface of the basic body for the purpose of affixing a line. If the screw is screwed into the internal thread of the screw body of the screw nut, when a defined torque is exceeded this will cause the clamping body and the screw body to take up the unlocked position, so that it is possible to ensure that if there is any further rotation of the screw or of the screw nut no further clamping force is applied to the affixed line.

BRIEF DESCRIPTION OF THE DRAWINGS

Below, the invention is explained by way of examples with reference to the attached drawings. The exemplary embodiment described in the figures only serves to provide a better understanding of the invention, and in particular must not be interpreted as limiting the scope of the patent in any way. The following are shown.

Across all the figures, the same or corresponding reference characters are used for identical or similar elements. The illustrations are not necessarily to scale, but they indicate qualitative size relationships.

DETAILED DESCRIPTION

Below, the present invention is described in detail with reference to FIGS. 1-13, wherein in the respective passages of description predominantly one or several figures is/are referred to; however, to gain a better understanding the remaining figures should be regarded in parallel, from which figures a person versed in the art will select the most appropriate for a given purpose.

Figure 1:
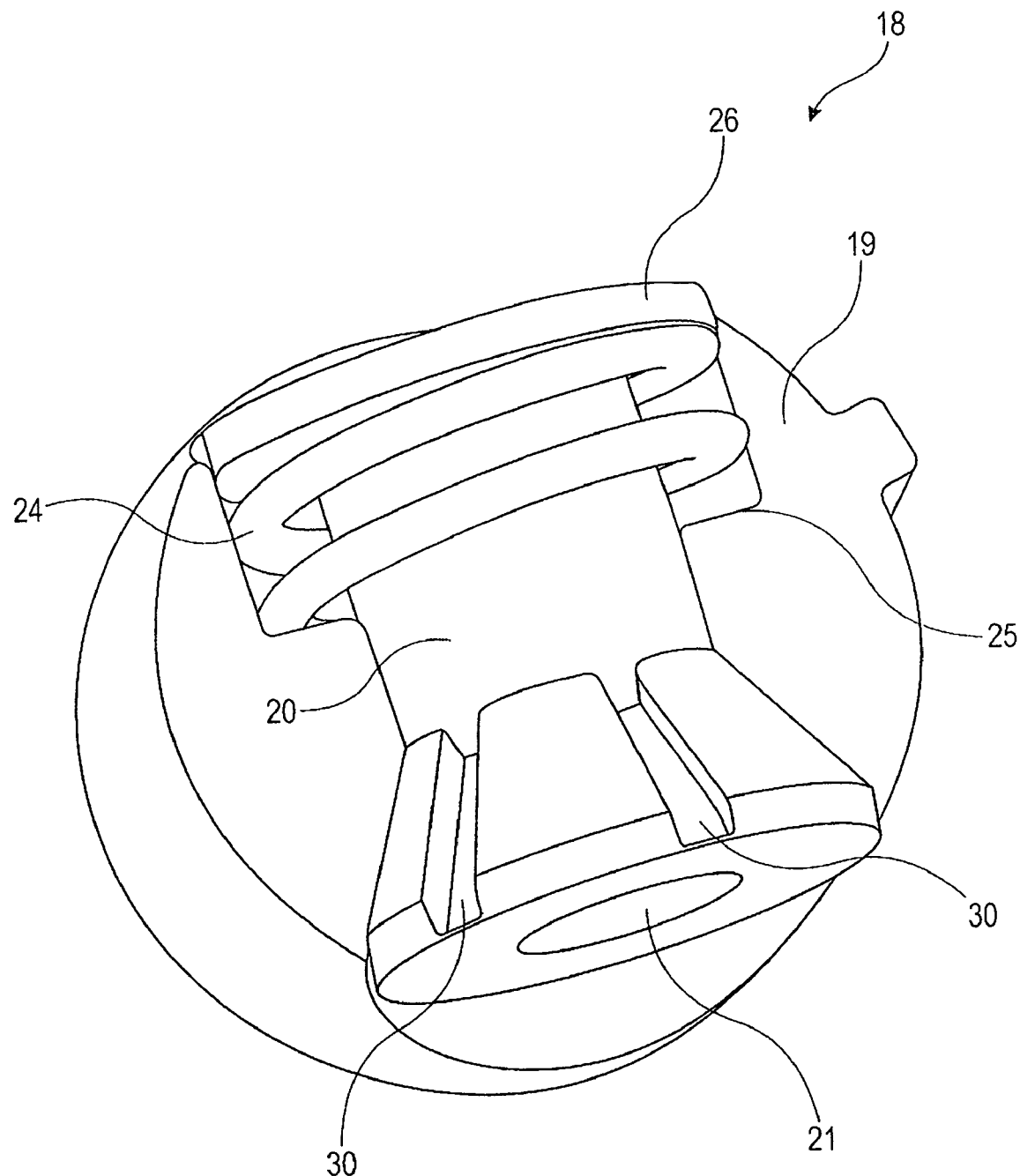
FIG. 1 shows a perspective section view of the screw nut according to the invention.
Figure 2:
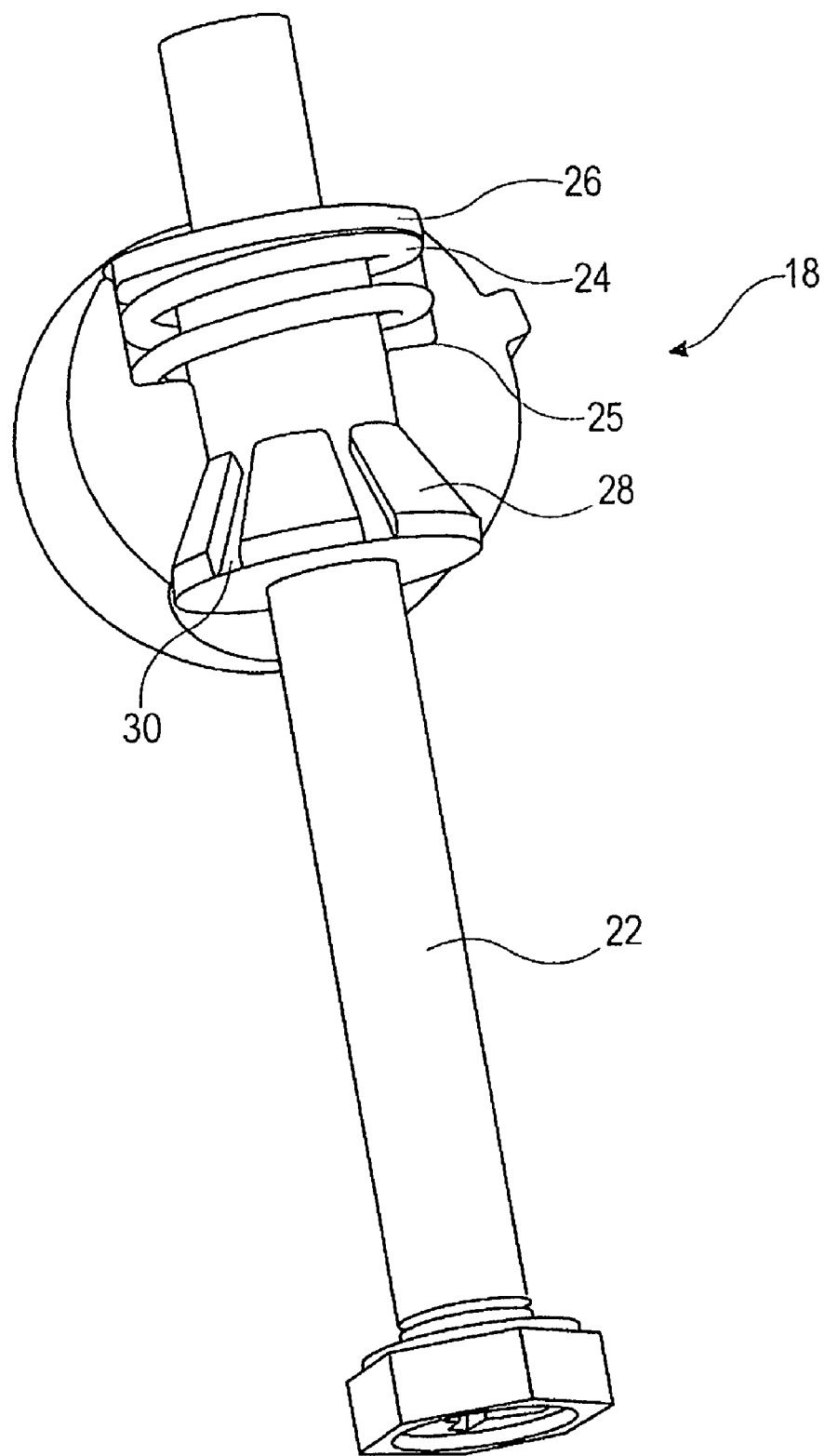
FIG. 2 shows a perspective section view of the screw nut according to the invention, with a screw screwed into place.
Figure 3:
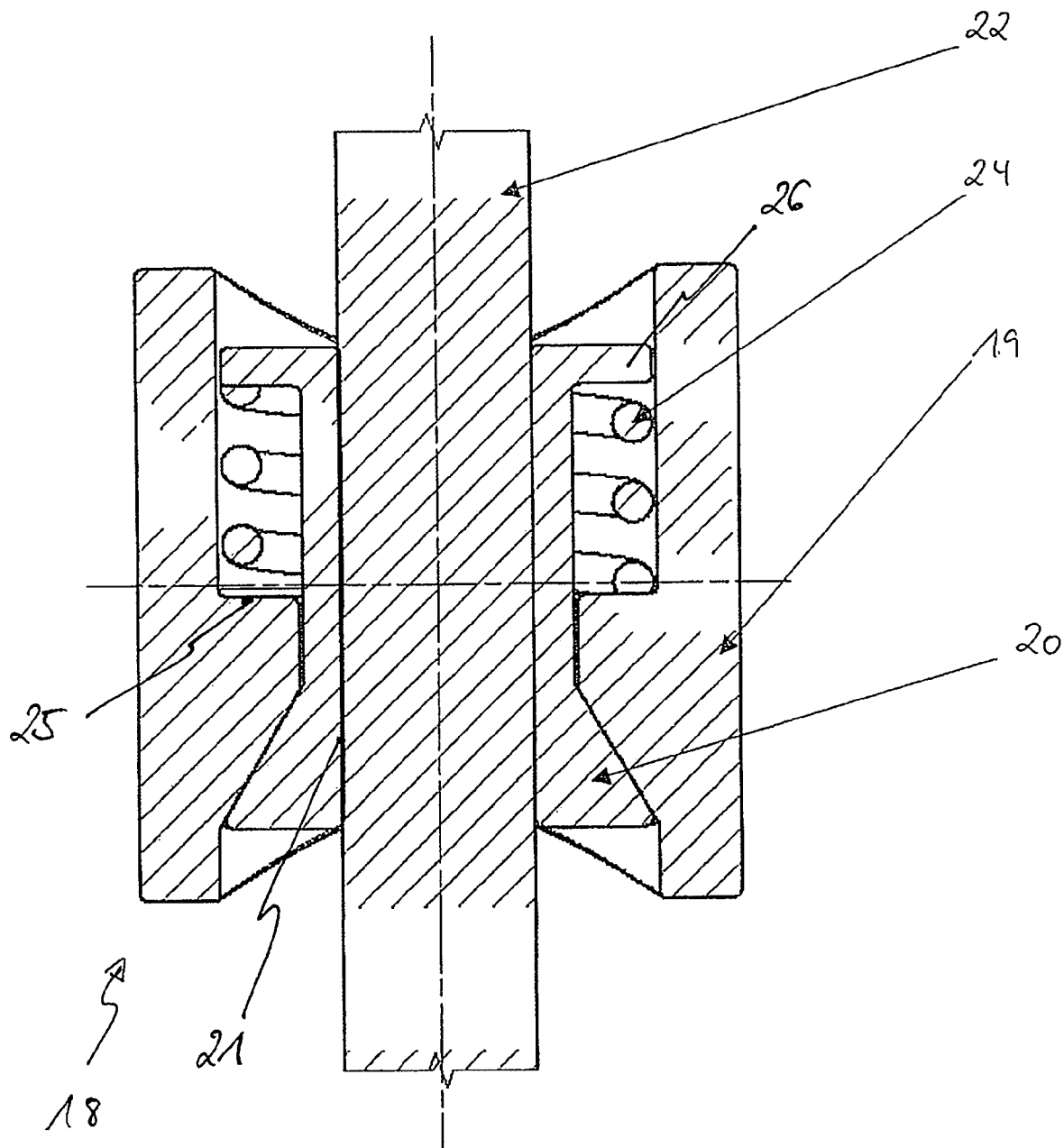
FIG. 3 shows a cross-sectional view of the screw nut according to the invention, including a screwed-in screw shaft.

FIG. 1 shows the screw nut 18 according to the invention for limiting a torque or a clamping force in a perspective cross-sectional view with only the clamping body 19 being cut. In contrast to this, FIG. 3 shows a two-dimensional cross-sectional view of the screw nut 18 according to the invention, into which screw nut 18 a screw 22 has been screwed. Both figures show that the screw nut 18 according to the invention comprises a clamping body 19 that is situated on the outside, which clamping body 19, when the screw nut 18 according to the invention is screwed onto a screw 22, for example as shown in FIG. 2, exerts a clamping force when it comes to rest against a component (not shown) to be screwed into place. Apart from the camping body 19 the screw nut according to the invention further comprises a screw body 20 which on the inside comprises an internal thread 21 by means of which the screw nut can be screwed onto the above-mentioned screw 22, as is shown in FIGS. 2, 4, 5 and 6.

As already mentioned the screw body 20 is arranged in the interior of the clamping body 19; it can be moved to and fro between a locked position, for example as shown in FIG. 1, and an unlocked position in the direction of the internal thread 21. To prevent the screw body 20 from inadvertently moving to the unlocked position, the screw nut 18 further comprises a spring element 24 which generates a restoring force between the clamping body 19 and the screw body 20 that continuously attempts to hold the screw body 20 in relation to the clamping body 19 in the locked position. If a torque is applied to the screw nut 18 or to the shaft of the screw 22, which torque exceeds a predefined value, this causes the screw nut 18 or the screw body 20 to take up its unlocked position in which the screw body 20 can rotate freely in the clamping body 19 so that if further torque is applied to the shaft of the screw 22 or to the screw nut 18, it is no longer possible to apply further clamping force to the component to be screwed into place.

As shown in FIGS. 1-6, the clamping body 19 and the screw body 20 are arranged coaxially in relation to each other, wherein the clamping body 19 comprises a through aperture 23 in the interior, in which through aperture it can accommodate the screw body 20. In this arrangement the through aperture 23 is shaped such that the screw body 20 can be slid to and fro in longitudinal direction in the through aperture 23, between the unlocked position and the locked position, i.e. in axial direction of the internal thread 21 of the screw body 20.

Figure 9:
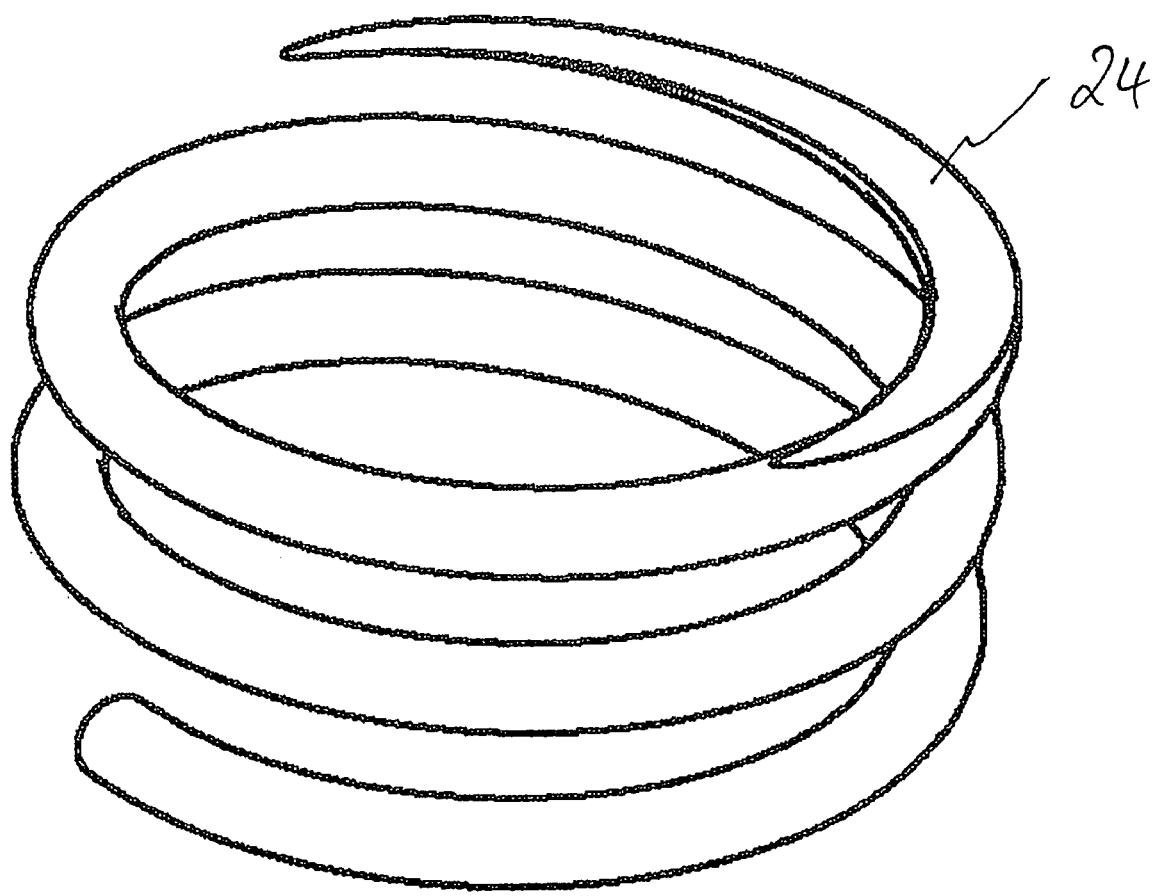
FIG. 9 shows a perspective view of a spring element.

While in the embodiment shown in the figures a helical spring is used as a spring element 24, as also shown in an enlarged view in FIG. 9, it is of course also possible instead of using such a helical spring to use a rubber spring, leaf spring, saucer spring or an air spring in order to generate the restoring force required that attempts to push the screw body 20 continuously into the locked position.

For the spring element 24 to be able to generate a pressure force onto the two bodies 19, 20 in order to push the screw body 20 into the locked position, both the clamping body 19 and the screw body 20 comprise suitable abutment surfaces 26, 27, between which the spring element extends.

As shown in FIGS. 1, 2, 3 and 4, the through aperture of the clamping body 19 comprises a first abutment surface 25 in the form of a ring shoulder 25, which represents an offset in the through aperture 23. In contrast to this, the screw body 20 is circumferentially enclosed in a collar-like manner by a ring flange 26 so that the abutment surface of the screw body 20 is formed. Between the ring flange 26 and the ring shoulder 25 the spring element 24 extends in order to generate pressure onto these abutment surfaces so as to in this way continuously push the screw body 20 into the locked position.

Figure 4:
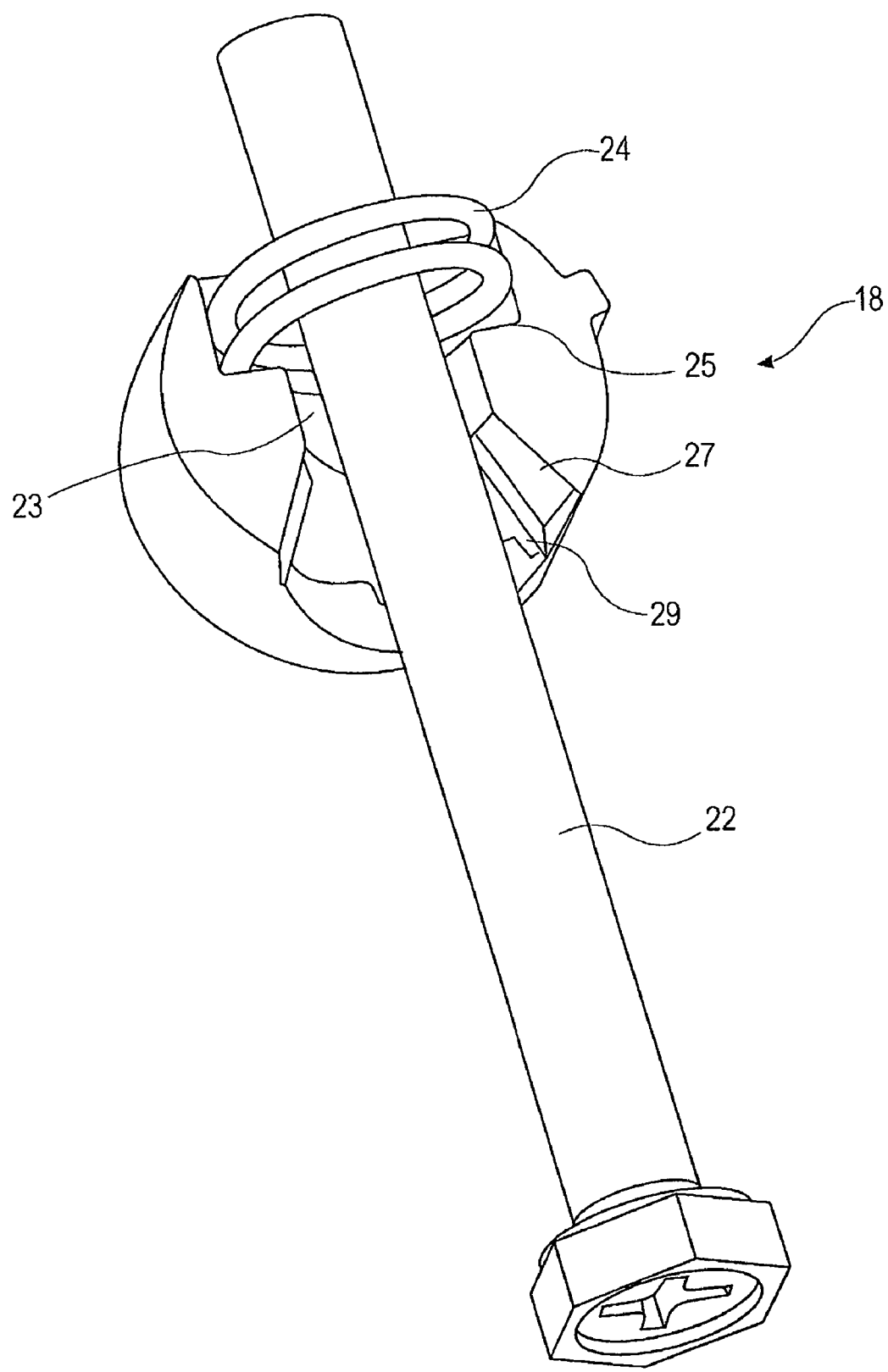
FIG. 4 shows a perspective section view of a screw nut according to the invention, without a clamping body.
Figure 5:
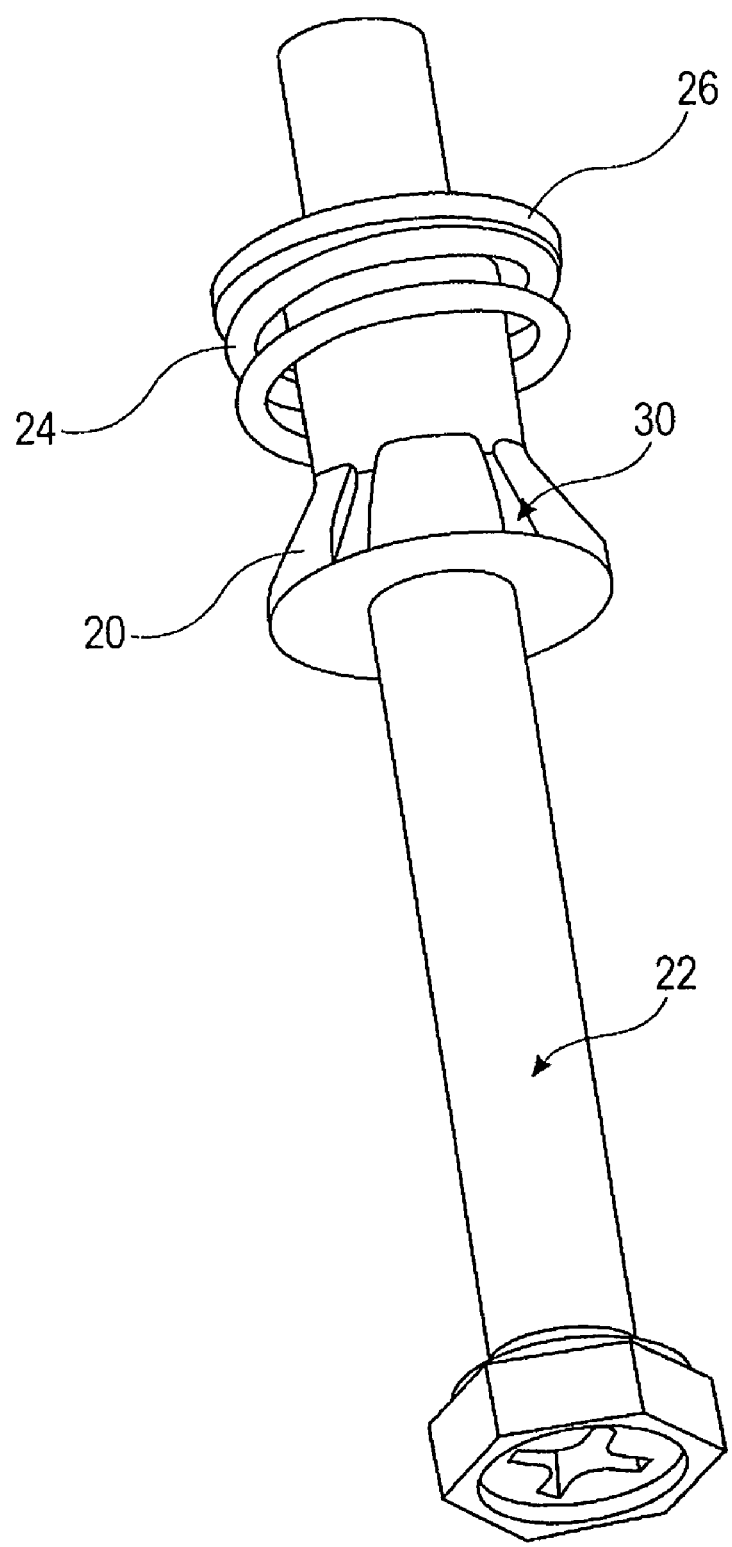
FIG. 5 shows a perspective view of a screw body screwed onto a screw shaft.

As has already been mentioned, in the locked position the clamping body 19 and the screw body 20 engage each other having positive fit by way of a positive-locking mechanism. This positive-locking mechanism is formed by an internal cone 27 and an external cone 28 with corresponding positive-locking means 29, 30 that in the locked position engage each other having positive fit. In the through aperture 23 of the clamping body 19 an internal cone 27 is formed that comprises first positive-locking means 29 in the form of several slots (see FIGS. 1, 5). In contrast to this the screw body 20 is enclosed by an external cone 28 that comprises second positive-locking means 30 in the form of several ridges or teeth (FIG. 4). The dimensions of the internal cone 27 and of the external cone 28 as well as of the associated first and second positive-locking means 29, 30 match each other such that the internal cone 27 precisely fits together with the external cone 28 so that in the locked position the first positive-locking means 29 engage the second positive-locking means 30 having positive fit.

Figure 6:
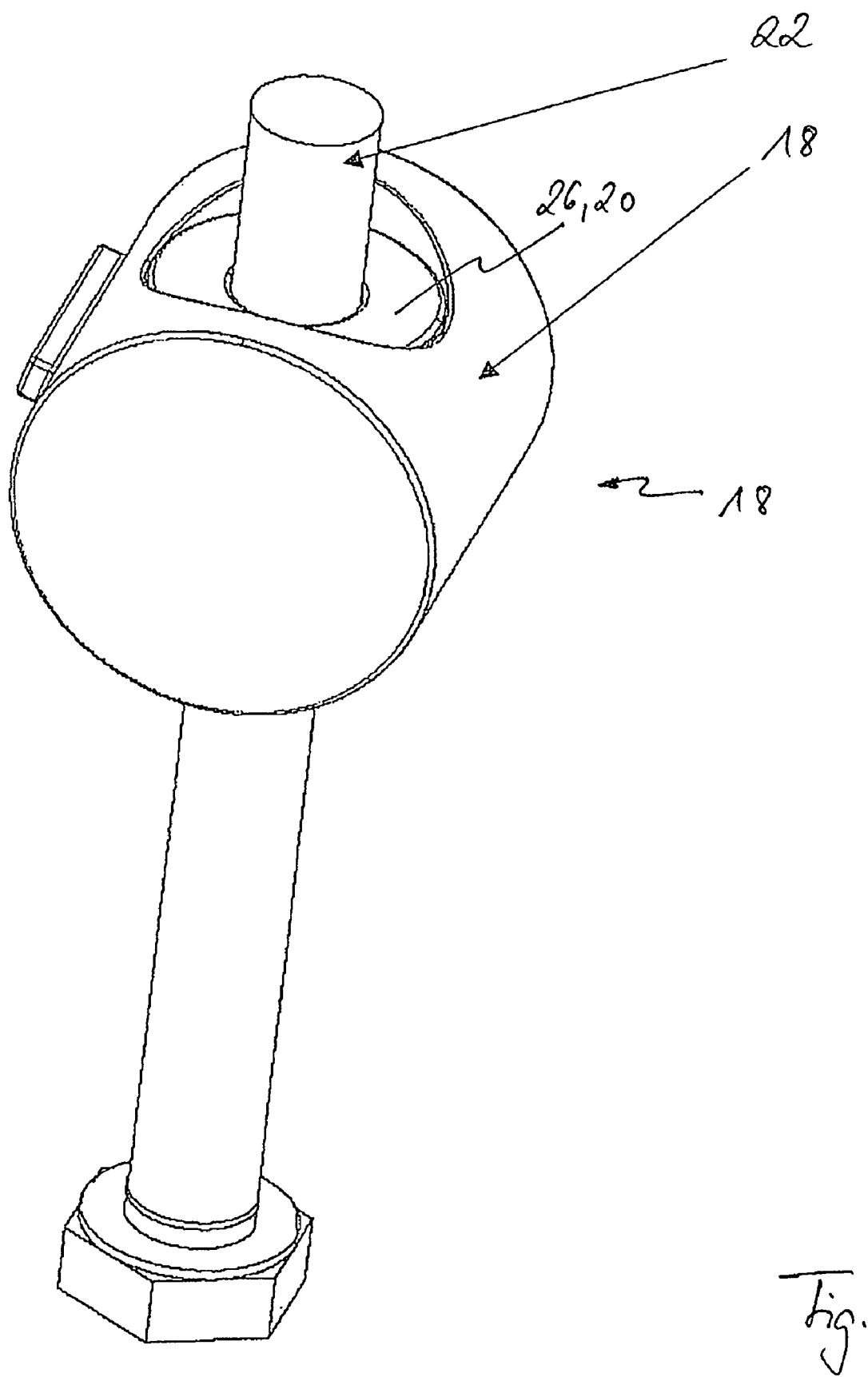
FIG. 6 shows a perspective view of a connection comprising a screw nut according to the invention and a screw.
Figure 7:
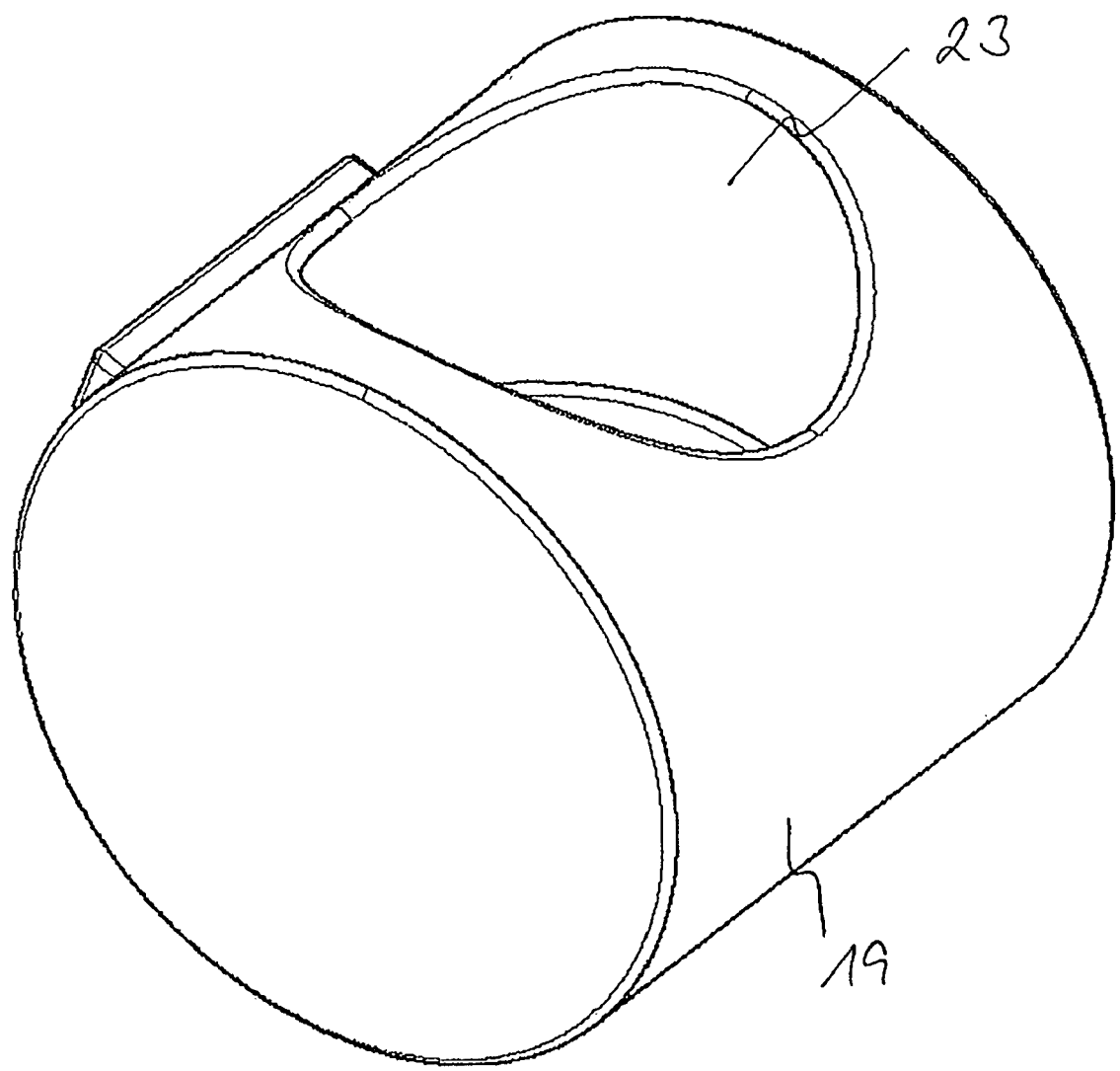
FIG. 7 shows a perspective view of a clamping body.
Figure 8:
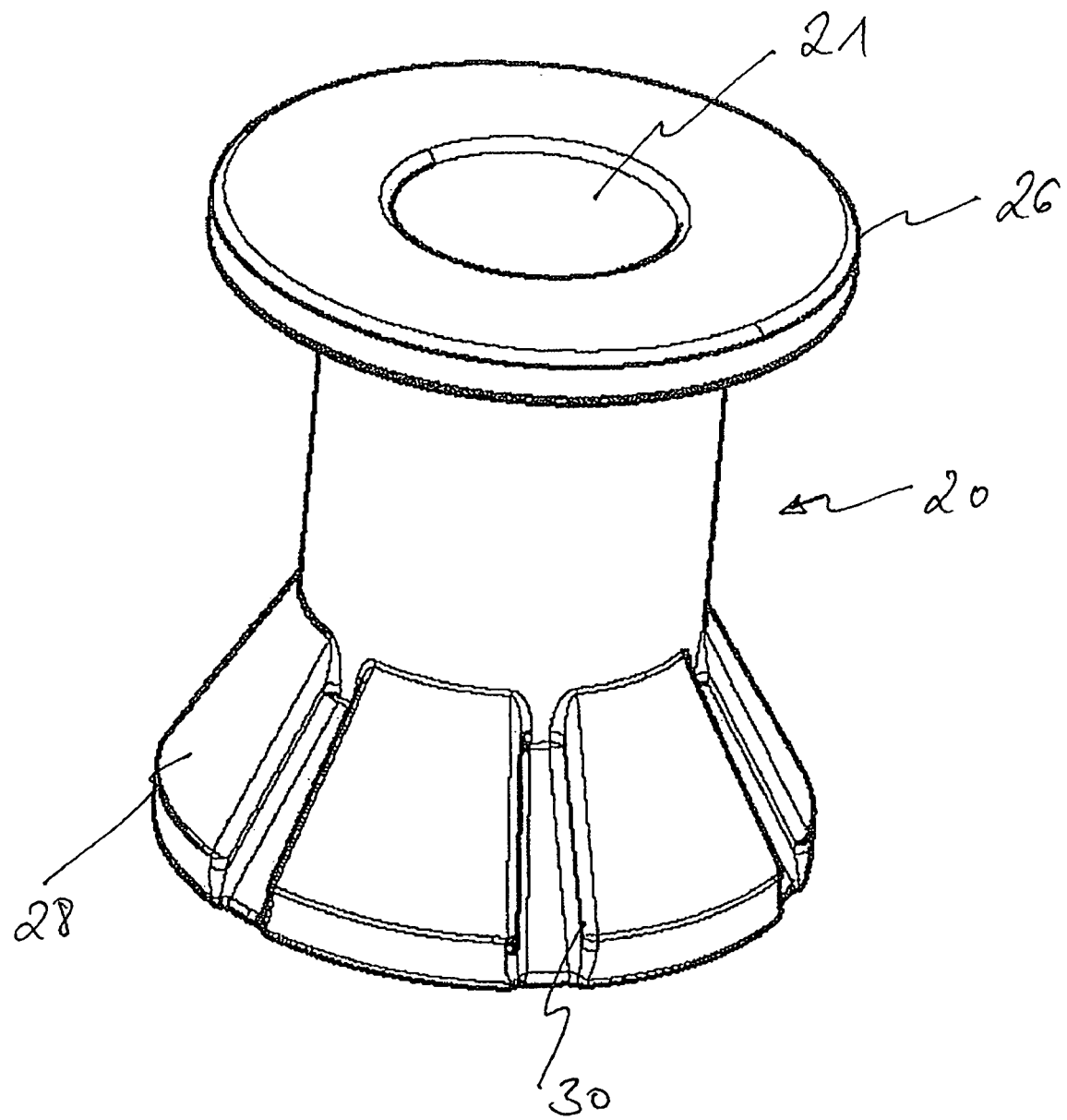
FIG. 8 shows a perspective view of a screw body.

If, for example, in a screw-to-nut connection as for example shown in FIG. 2 or 6 a torque is applied by way of the screw 22 or the screw nut 18, then, if the clamping force applied with the screw-to-nut connection exceeds a predefined magnitude, this will cause the spring element 24 to be compressed and thus the screw body 20 to move into the unlocked position in which by way of the screw nut 18 or the screw 22 no further torque, and thus also no further clamping force, can be applied any longer onto the component (not shown) to be screwed into place. Instead, the screw 22 or the screw nut 18 will rotate without engagement, and in this way will not further increase the torque or the clamping force.

Figure 10:
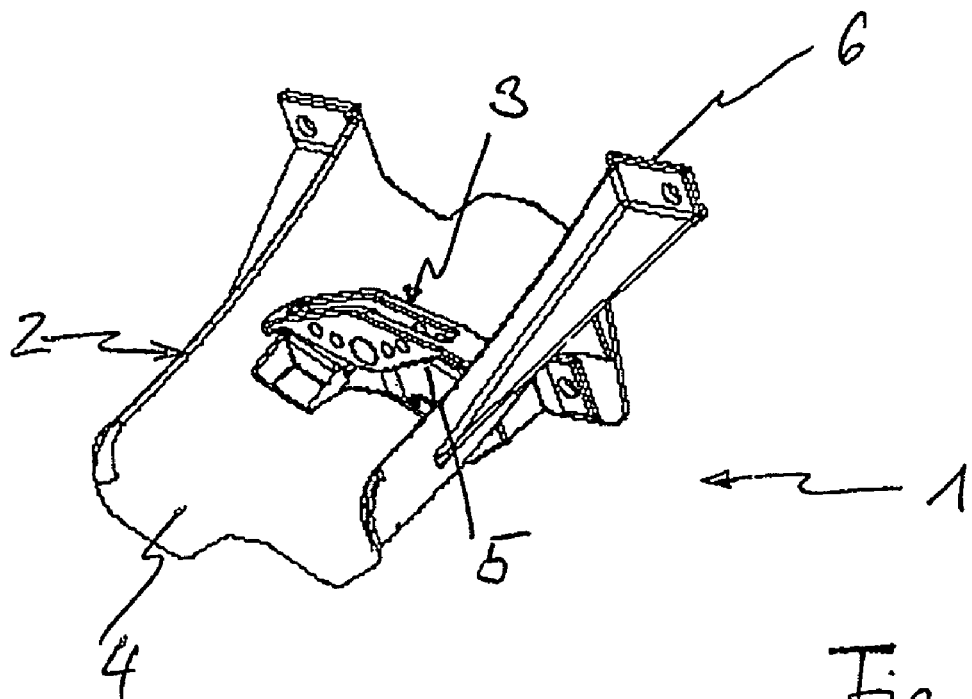
FIG. 10 shows the use of the screw nut according to the invention in a retainer module.
Figure 11:
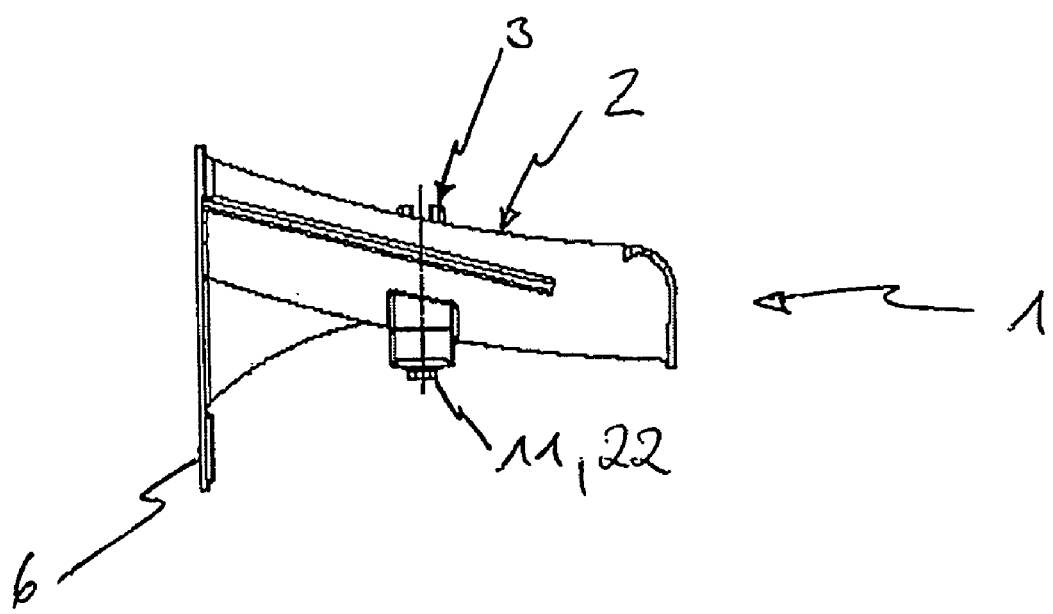
FIG. 11 shows a lateral view of the retainer module shown in FIG. 10.

With reference to FIGS. 10-13 the use according to the invention of the screw nut 18 is described. FIG. 10 shows a retainer module 1 in a perspective view, which retainer module 1 essentially comprises a basic body 2 and a traverse 3. The basic body 2 and the traverse 3 can be made from a plastic material.

Figure 12:
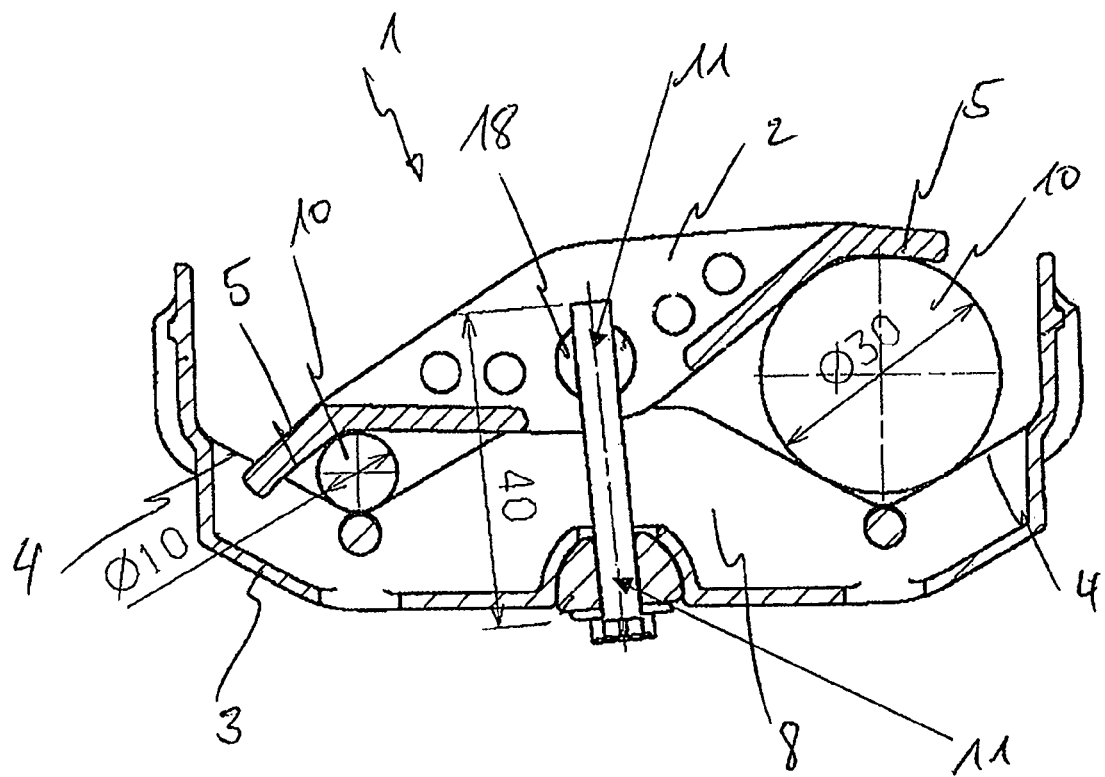
FIG. 12 shows a cross section of a retainer module with a thin line and a thick line.

Along its surface the basic body 2 comprises a bearing surface 4 for accommodating a line 10 (not shown), with the basic body 2 ending with an abutment surface 6 by means of which the basic body 2 can, for example, be attached to a structural component of an aircraft. As shown in FIG. 12, the abutment surface 6 is inclined in relation to the main direction of extension of the basic body 2 and forms a plane surface which comprises boreholes for attaching the retainer module 1 to a structural component. As shown in FIG. 12, the traverse 1 is arranged above the bearing surface 4 of the basic body 2 so that the counter-bearing surface 5 of the traverse 3 is spaced apart from, and facing, the bearing surface 4 of the basic body 2.

The bearing surface 4 of the basic body 2 comprises a recess 8 which at least partially accommodates the traverse 3.

Figure 13:
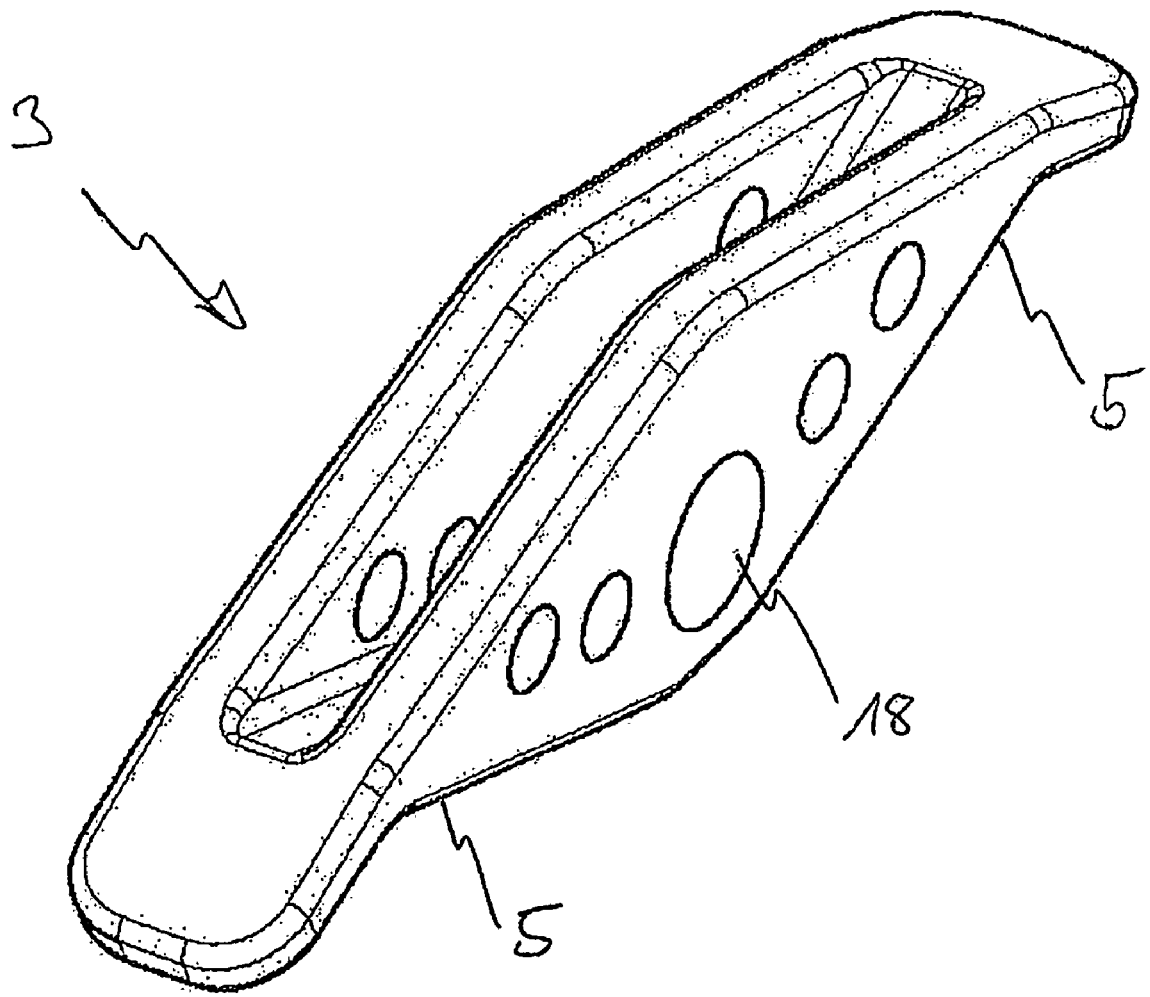
FIG. 13 shows a perspective view of a traverse of the retainer module.

FIG. 13 shows a perspective view of the traverse 3, which on its underside comprises two counter-bearing surfaces 5 that are offset in relation to each other and that merge into each other, and when seen in connection with each other in a cross-sectional view are wave-shaped. In the middle of the traverse 3, horizontally through it, a central through aperture extends, into which the screw nut according to the invention can be fitted as a rotary axis on which the traverse can be rocked as a balance arm.

As shown in FIGS. 10 and 12, the traverse 3 is arranged so as to be spaced apart from the basic body 2 so that the bearing surfaces 4 of the basic body 2 are facing the counter-bearing surfaces 5 of the traverse 3, spaced apart by lines 10 that are fitted between the bearing surfaces 4 and the counter-bearing surfaces 5, and are clamped into place.

The traverse 3 is connected to the basic body 2 with the use of a tensioning means 11 in the form of a screw 22 that is screwed into the internal thread 21 of the screw body 20, which in turn fits into the traverse 3 by way of the clamping body. In this arrangement the screw head of the screw is held in a specially designed abutment 16 that is formed below the bearing surface 4 and that is suitable to allow cone-shaped rotation of the screw 22.

The screw head of the screw 22 thus finds a corresponding abutment 16 below the basic body 2 of the retainer module 1 so that, when the screw 22 is tightened, the traverse 3 is caused to move in the direction of the basic body 2. To prevent the line 10 that is to be affixed to the retainer module 1 from being pinched or damaged as a result of excessive torque applied with the screw 22, the screw nut 18 according to the invention is used, which limits the clamping force that can be produced by way of the screw 22. For, as soon as the clamping force produced by the screw 22 exceeds a clamping force predetermined by the spring constant of the spring element 24, this causes the screw 22 to pull the screw body 20 from the locked position to the unlocked position in which the screw body 20 and the clamping body 19 no longer engage each other so that the screw 22 rotates without engagement and so that it is no longer possible to produce any further torque. Thus in a very simple and space-saving manner, implementation for limiting torque in a screw-to-nut connection is provided without the need to use a torque wrench.

In addition it should be pointed out that "comprising" does not exclude other elements or steps, and "a" or "one" does not exclude a plural number. Furthermore, it should be pointed out that characteristics or steps which have been described with reference to one of the above embodiments can also be used in combination with other characteristics or steps of other embodiments described above. Reference characters in the claims are not be interpreted as limitations.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

LIST OF REFERENCE CHARACTERS

1 Retainer module 20 Screw body
2 Basic body 21 Internal thread
3 Traverse 22 Screw
4 Bearing surface 23 Through aperture
5 Counter-bearing surface 24 Spring element
6 Abutment surface 25 Ring shoulder
8 Recess 26 Ring flange
10 Lines 27 Internal cone
11 Tensioning means 28 External cone
18 Screw nut 29 First positive-locking means
19 Clamping body 30 Second positive-locking means

The invention claimed is:

1. A screw nut for limiting a torque or a clamping force that is produced by screwing a screw onto a component to be fastened, comprising:
   a clamping body which, during screwing, comes to rest against the component to be screwed;
   only a single screw body with an internal thread, for screwing the screw nut onto the screw; and
   a spring element;
   wherein the clamping body and the single screw body are movably arranged in axial direction of the internal thread between an unlocked position and a locked position,
   wherein the clamping body and the single screw body in the locked position engage each other, having positive fit, by way of a positive-locking mechanism, and
   wherein when a defined clamping force is exceeded, the unlocked position where the clamping body and the single screw body disengage each other is taken up, with a restoring force continuously acting against this state transition, the restoring force generated by the spring element between the clamping body and the screw body.

2. The screw nut of claim 1, wherein the clamping body and the screw body are arranged coaxially in relation to each other.

3. The screw nut of claim 1, wherein the clamping body comprises a through aperture in which it accommodates the screw body.

4. The screw nut of claim 1, wherein the spring element is arranged as one spring element from the group of spring elements consisting of a helical spring, rubber spring, leaf spring, saucer spring and an air spring.

5. The screw nut of claim 1, wherein the spring element extends between a first abutment surface on the clamping body and a second abutment surface on the screw body.

6. The screw nut of claim 5, wherein the first abutment surface is a ring shoulder located in the through aperture of the clamping body, and wherein the second abutment surface is a ring flange that circumferentially encloses the screw body in a collar-like manner.

7. A screw nut for limiting a torque or a clamping force that is produced by screwing a screw onto a component to be fastened, comprising:
   a clamping body which, during screwing, comes to rest against the component to be screwed; and
   only a single screw body with an internal thread, for screwing the screw nut onto the screw;
   wherein the clamping body and the single screw body are movably arranged in axial direction of the internal thread between an unlocked position and a locked position,
   wherein the clamping body and the single screw body in the locked position engage each other, having positive fit, by way of a positive-locking mechanism, and
   where in use with other additional but unclaimed elements, when a defined clamping force is exceeded, the unlocked position where the clamping body and the single screw body disengage each other is taken up, with a restoring force continuously acting against this state transition, wherein the positive-locking mechanism comprises an internal cone that extends coaxially in the through aperture of the clamping body and comprises first positive-locking means, and the positive-locking mechanism comprises an external cone that circumferentially encloses the screw body and comprises second positive-locking means, and wherein the internal cone and the external cone plunge into each other in the locked position so that the first positive-locking means and the second positive-locking means engage each other having positive fit.

8. A screw nut for limiting a torque or a clamping force that is produced by screwing a screw onto a component to be fastened, comprising:
   a clamping body which, during screwing, comes to rest against the component to be screwed; and
   only a single screw body with an internal thread, for screwing the screw nut onto the screw;
   wherein the clamping body and the single screw body are movably arranged in axial direction of the internal thread between an unlocked position and a locked position,
   wherein the clamping body and the single screw body in the locked position engage each other, having positive fit, by way of a positive-locking mechanism,
   where in use with other additional but unclaimed elements, when a defined clamping force is exceeded, the unlocked position where the clamping body and the single screw body disengage each other is taken up, with a restoring force continuously acting against this state transition, and
   wherein the clamping body is of a cylindrical design whose main axis extends so as to be perpendicular to the axial direction of the internal thread of the screw body.

9. A screw nut system comprising:
   a screw nut in a retainer module for affixing lines of different thicknesses, the screw nut for limiting a torque or a clamping force that is produced by screwing a screw onto a component to be fastened, the screw nut including:
      a clamping body which, during screwing, comes to rest against the component to be screwed; and
      only a single screw body with an internal thread, for screwing the screw nut onto the screw;
      wherein the clamping body and the single screw body are movably arranged in axial direction of the internal thread between an unlocked position and a locked position,
      wherein the clamping body and the single screw body in the locked position engage each other, having positive fit, by way of a positive-locking mechanism, and
      where in use with other additional but unclaimed elements, when a defined clamping force is exceeded, the unlocked position where the clamping body and the single screw body disengage each other is taken up, with a restoring force continuously acting against this state transition;
   a basic body with at least one bearing surface for accommodating a line, as well as an abutment surface for attaching the basic body to a structural component;
   at least one traverse, arranged as a balance arm, with at least one counter-bearing surface that is movably positioned in relation to the basic body such that the line as a result of movement of the at least one traverse, is affixable in at least one degree of freedom between the at least one bearing surface of the basic body and the at least one counter-bearing surface of the at least one traverse;
   at least one screw that movably connects the at least one traverse to the basic body, and which screw is arranged to cause the at least one traverse to move in the direction of the basic body,
   wherein the clamping body of the screw nut comprises a cylindrical external contour by means of which it is fitted into a correspondingly designed cylindrical aperture in the middle of the balance arm so that the balance arm can be rocked in relation to the bearing surface of the basic body for the purpose of affixing a line, and
   wherein the screw is screwed into the internal thread of the screw body of the screw nut so that when a defined torque is exceeded the unlocked position is taken up.

10. A screw nut for limiting a torque or a clamping force that is produced by screwing a screw onto a component to be fastened, comprising:
   a clamping body which, during screwing, comes to rest against the component to be screwed; and
   only a single screw body with an internal thread, for screwing the screw nut onto the screw;
   wherein the clamping body and the single screw body are movably arranged in axial direction of the internal thread between an unlocked position and a locked position,
   wherein the clamping body and the single screw body in the locked position engage each other, having positive fit, by way of a positive-locking mechanism, and
   where in use with other additional but unclaimed elements, when a defined clamping force is exceeded, the unlocked position where the clamping body and the single screw body disengage each other is taken up, with a restoring force continuously acting against this state transition, and
   wherein the positive-locking mechanism comprises a plurality of slots that engage with a plurality of ridges or teeth.

11. A screw nut for limiting a torque or a clamping force that is produced by screwing a screw onto a component to be fastened, comprising:
   a clamping body;
   only a single screw body having an internal thread; and
   a spring;
   wherein the clamping body, the single screw body, and the spring are axially movably arranged between an unlocked position and a locked position of the screw nut;
   wherein in the locked position, the spring is positioned to bias the single screw body into engagement with the clamping body, and wherein in the unlocked position, obtained when a defined clamping force of the spring is exceeded, the single screw body disengages from the clamping body.

12. The screw nut of claim 11, wherein the defined clamping force of the spring is exceeded by sufficient force acting on the internal threads of the single screw body.

* * * * *